Figure 1:
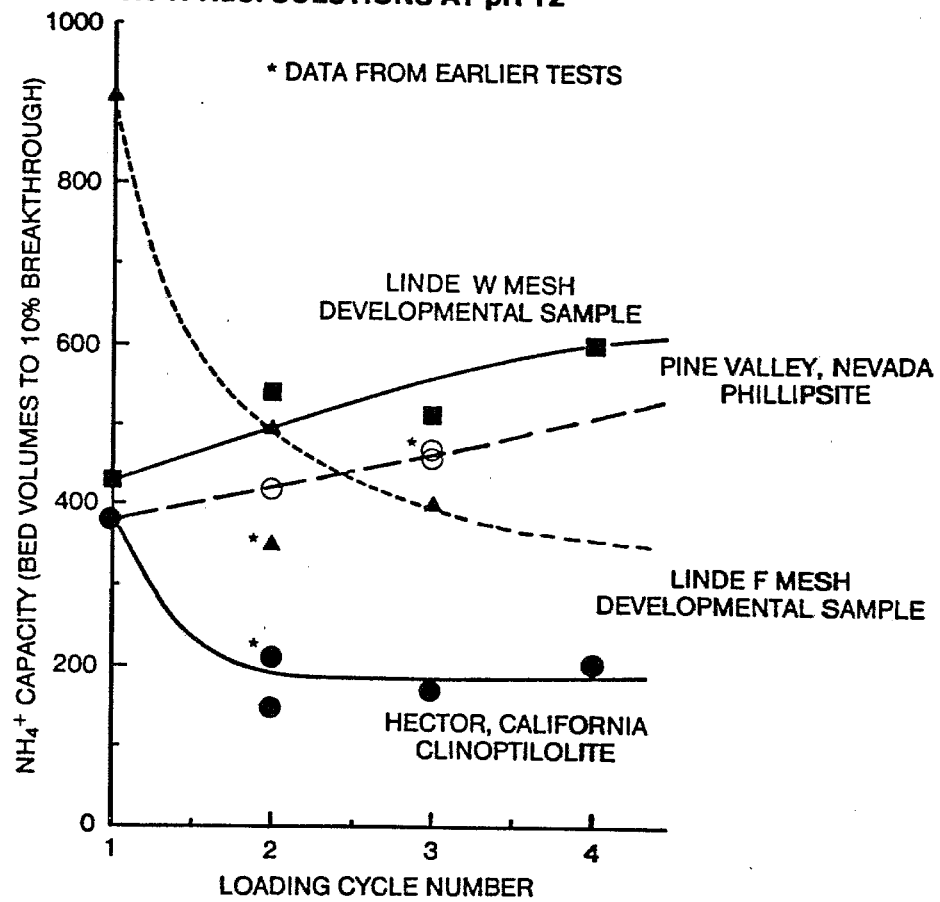

United States Patent [19]

Sherman et al.

[11] 4,344,851
[45] Aug. 17, 1982

[54] PHILLIPSITE-TYPE ZEOLITES FOR AMMONIA ADSORPTION

[75] Inventors: John D. Sherman, Chappaqua; Ronald J. Ross, Upper Nyack, both of N.Y.

[73] Assignee: Union Carbide Corporation, Danbury, Conn.

[21] Appl. No.: 225,528

[22] Filed: Jan. 16, 1981

Related U.S. Application Data

[63] Continuation-in-part of Ser. No. 828,378, Aug. 29, 1977, abandoned, which is a continuation-in-part of Ser. No. 488,503, Jul. 15, 1974, abandoned.

[51] Int. Cl.³ .............................................. C02F 1/42

[52] U.S. Cl. .................................. 210/670; 210/681; 210/687

[58] Field of Search ..................... 210/670, 681, 687

[56] References Cited

U.S. PATENT DOCUMENTS 3,723,308 3/1973 Breck .............................. 210/681

Primary Examiner—Ivars C. Cintins
Attorney, Agent, or Firm—Richard G. Miller

[57] ABSTRACT

Ammonium ions are selectively removed from aqueous solutions containing calcium cations by cation exchange with natural or synthetic zeolites of the phillipsitegismondite type, which possess unusual capacity and selectivity for the ammonium ion.

2 Claims, 2 Drawing Figures

PHILLIPSITE-TYPE ZEOLITES FOR AMMONIA ADSORPTION

RELATED APPLICATIONS

This is a continuation-in-part of application Ser. No. 828,378, filed Aug. 29, 1977 which is in turn a continuation of application Ser. No. 488,503 filed July 15, 1974, both now abandoned.

BACKGROUND OF THE INVENTION

This invention relates to the zeolitic cation exchange of ammonium ions from aqueous solutions containing calcium cations and more particularly concerns the selective cation exchange of such solutions with certain natural or synthetic crystalline aluminosilicates. The invention is also concerned with the purification of waste waters containing ammonium cations in addition to calcium cations.

Ammonia, or the ammonium cation, has long been recognized as a serious pollutant in water. Its presence in municipal waste water and in the effluent from agricultural and industrial operations is as harmful as it is pervasive.

It has become apparent that the presence of ammonia in water has far more serious implications than merely serving as an index of recent pollution. It can be toxic to fish and aquatic life; while a maximum recommended ammonia concentration is 2.5 mg/l, as little as 0.3 to 0.4 mg/l is lethal to trout fry. It can contribute to explosive algae growths, ultimately causing eutrophic conditions in lakes. It can restrict waste water renovation and water reuse; since typical municipal waste water may contain 30 mg/l $NH_4$, the removal of 90-95% would be required for water reuse, but to achieve this by conventional electrodialysis would be prohibitively costly. It can have detrimental effects on disinfection of water supplies; it reacts with chlorine to form chloramines which, while still bactericidal, are slower acting and less effective. Lastly, ammonia can be corrosive to certain metals and materials of construction; its effect on copper and zinc alloys is well known, and it can also be destructive to concrete made from portland cement.

Cation exchange for ammonia removal, using a variety of cation-active "zeolites", has been studied extensively but has resulted in only limited commercial utilization. The permutits (synthetic gel "zeolites" derived from sodium silicate and aluminum sulfate) and the hydrous gel-type amorphous minerals such as glauconite ("green sand") are effective but suffer from hydrolytic instability, have relatively low exchange capacity, often have other unsatisfactory regeneration characteristics, and may be difficult to form into useful shapes of acceptable physical properties. Organic "zeolites", which are sulfonated or carboxylated high polymers, are not selective for the ammonium ion, and instead prefer other cations such as calcium. In addition, their use entails excessive regenerant wastes.

Certain of the natural and synthetic crystalline aluminosilicates, which are true zeolites, have been studied for use in the selective cation exchange removal of ammonia. Fundamentally, the problem of selecting a zeolite is to obtain one having both adequate cation exchange capacity and adequate selectivity for the ammonium cation in the presence of calcium cations, which almost inevitably are present in waste water streams. Some crystalline aluminosilicates appear to possess desirable selectivity characteristics for ammonium ions in the presence of calcium ions but have relatively low exchange capacity for ammonium ions. Other commonly available crystalline zeolites appear to have an abundant initial exchange capacity for ammonium ions but poor selectivity therefor in the presence of calcium ions. Consequently in cyclic processes in which there is cumulatively an appreciable contact of these latter types of zeolites with calcium cations, there is a significant up-take of calcium ions by the zeolite and a corresponding loss of exchange capacity for ammonium ions. Moreover, the available evidence suggests that, in certain zeolites at least, the zeolitic calcium cations reduce the effectiveness of far more potential sites for ammonium ion exchange than those actually occupied by the calcium ions. Thus relatively small exchanged amounts of calcium are observed to drastically reduce the capacity of these zeolites for ammonium ion exchange even though periodic regenerations with sodium or other alkali metal ions are carried out.

It is, accordingly, an object of the invention to provide a method for the zeolitic cation exchange removal of ammonium ions from an aqueous solution containing calcium cations utilizing a zeolite possessing both high cation exchange capacity and excellent selectivity for the ammonium ion; and which zeolite has the necessary advantageous characteristics of rapid rate of exchange, ease and completeness of regeneration, stability to both the exchange solution and regenerant solutions, capability of functioning over a comparatively broad range of acidities and alkalinities, long service life, and relatively low economic cost.

SUMMARY OF THE INVENTION

Briefly, in accordance with the invention, ammonium ions are removed from aqueous solutions containing calcium cations by effecting the removal with natural or synthetic zeolitic crystalline aluminosilicates of the phillipsitegismondite type. Even when used in impure form, these zeolites have unusual capacity and selectivity for the ammonium cation in the presence of interfering metal ions.

The reasons for the ability of the phillipsitegismondite type zeolites to tolerate calcium ions far better than other zeolites of comparable ammonium ion exchange capacity (compared on a $Ca^{++}$-free basis) are not entirely understood. It is possible that structural character which zeolites of the phillipsite type have in common, hereinafter elucidated, gives rise to the absence or substantial absence of cation sites which can be either irreversibly occupied by calcium cation or sites which when occupied by calcium ions effectively shield other sites from contact with other cations such as $NH_4^+$. Either theory is consistent with the available evidence derived from batch tests and dynamic fixed bed tests. These tests demonstrate that whereas the initial $NH_4^+$ capacity of zeolite F, for example, is initially very high even when calcium ions are present in the $NH_4^+$-containing test solution, this level of capacity quickly drops to below that of a phillipsitetype zeolite when tested in the same manner. This phenomenon is not observable when the test solution is free of $Ca^{++}$, i.e. contains only monovalent cation species. Although the superiority of the phillipsitetype zeolites in this regard exists regardless of whether the manner of contacting the $NH_4^+$-$Ca^{++}$-containing aqueous solution is static (batch) or dynamic (flow) the dynamic type of contact appears to favor the more rapid establishment of the advantageous behavior vis-a-vis other zeolite types. These observations are a further elucidation of the hypotheses set forth in our prior application Ser. No. 828,378, filed Aug. 29, 1977, the entire contents of said prior application being incorporated by reference herein in its entirety.

The phillipsite-type, i.e. the phillipsite-gismondite family, of zeolites are those natural (mineral) and synthetic zeolites which have generally similar framework structures, and consequently similar X-ray diffraction patterns, but which may have different overall crystal symmetry and chemical composition (e.g. Si/Al distribution, cation type and content, water content, etc.). See the definitive article by Beard, "Linde Type B Zeolites and Related Mineral and Synthetic Phases," in "Molecular Sieve Zeolites I", Advances in Chemistry Series No. 101, p. 237 (1971). These zeolites include the minerals phillipsite, harmotome, and gismondite (gismondine), and the synthetic zeolites "P" (Linde zeolite B), ZK-19, and W.

The zeolites of the invention are all within the "Phillipsite Group" classification of Meier (Conference on Molecular Sieves, Soc. Chem. Ind., London, 10, 1968) and within Group 1 of Breck (Breck "Molecular Sieve Zeolites I", Advances in Chemistry Series No. 101. p. 1 (1971), and are based on structures composed of single rings of 4 alumina or silica tetrahedra which are interlinked by 8-tetrahedra rings. According to Meier's designation of the directions in which the one distinguishable oxygen atom in a tetrahedron points from the rings (in which "U" is upward and "D: is downward), the sequence of tetrahedra around the 4-rings is always UUDD; around the 8-ring in phillipsite and in harmotome it is UDDDDDDU, and in gismondite it is UUUUDDDDD. The 8-rings form apertures through the frameworks which establish the molecular sieving character of these zeolites; in phillipsite and harmotome the apertures are parallel to the "a", "b", and "c" crystallographic axes, while in gismondite they are parallel to both "a" and "c" directions. The synthetic zeolites ZK-19 and W are reported to have the phillipsite-harmotome structure; the various "P" zeolites (Linde zeolite B) are a series of synthetic zeolite phases which have been referred to as "phillipsite-like", "harmotome-like", or "gismondine-like", based on the similarities of their X-ray powder patterns to those of the respective minerals (see the above Beard article). Structures of the synthetic zeolites have not as yet been fully elucidated.

The phillipsite-gismondite type aluminosilicate zeolites are more fully defined in the table below, which includes literature references believed to contain the most accurate information on their structures, as presently known.

| PHILLIPSITE-GISMONDITE TYPE ZEOLITES | | |
|---|---|---|
| Zeolite | Typical Unit Cell Contents | Literature Reference |
| harmotome | $Ba_2 [(AlO_2)_4 (SiO_2)_{12}] \cdot 12 H_2O$ | Sadanaga et al., Acta Cryst., 14, 1153, (1961). |
| | | Sahama et al., Mineral Mag., 36, 444, (1967). |
| phillipsite | $(K, Na)_{10} (AlO_2)_{10} (SiO_2)_{22}] \cdot 20 H_2O$ | Steinfink, Acta Cryst., 15, 644 (1962) |
| gismondite | $Ca_4[(AlO_2)_8 (SiO_2)_8] \cdot 16 H_2O$ | Fischer et al., Naturw., 45, 488 (1958). |
| | | Fischer, Amer. Mineral, 48, 664 (1963) |
| zeolite P | $Na_6 [(AlO_2)_6 (SiO_2)_{10}] \cdot 18 H_2O$ | Barrer et al., J. Chem. Soc., 1521, (1959). |
| | | Barrer et al., J. Chem. Soc., 195 (1959). |
| | | Milton U.S. Pat. No. 3,008,803. |
| | | Beard, "Molecular Sieve Zeolites-I" A.C.S. 101 (1971). |
| zeolite ZK-19 | | Kuehl, Amer. Mineral, 54, 1607 (1969) |
| zeolite W | $K_{42} [(AlO_2)_{42} (SiO_2)_{76} \cdot 107 H_2O$ | Breck et al., Conf. M.S., Soc. Chem. Ind., London, 47, 1968. |
| | | Milton U.S. Pat. No. 3,012,853. |

Figure 2:
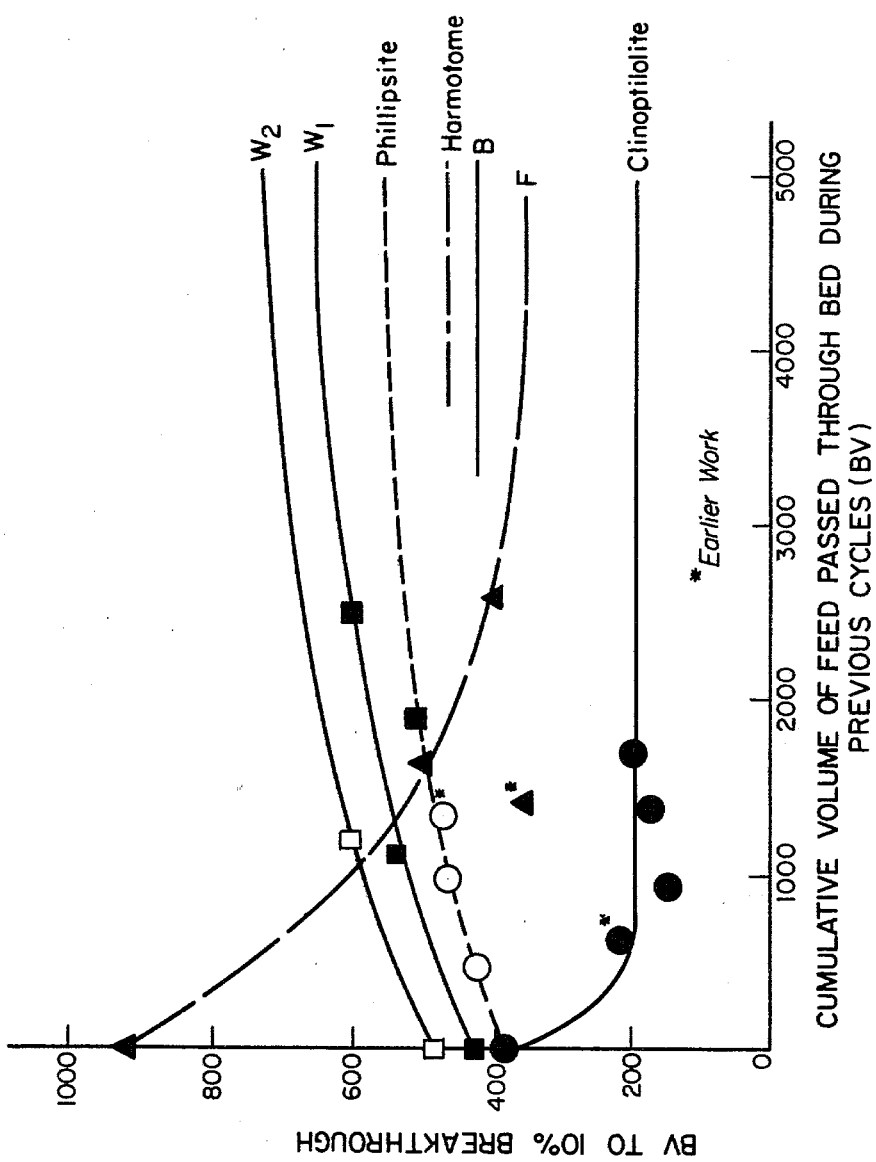

In the drawings:

FIG. 1 and FIG. 2 are graphical presentations of the data obtained in the experiments set forth in Example III.

EXAMPLE I

This Example demonstrates the effectiveness of a zeolite of the invention—potassium exchanged phillipsite—in comparison with other zeolites to effect the selective removal of $NH_4^+$ in a flow system.

To evaluate the zeolites for $NH_4^+$ exchange capacity from a mixed cation solution in a dynamic system, a common procedure was adopted which is a modification of a procedure used by Mercer et al. and reported in *Journal Water Pollution Control Federation,* Part 2, "Ammonia Removal from Secondary Effluents by Selective Ion Exchange," February 1970. The method is a column technique employing a glass column one inch i.d. and twelve inches long. The zeolite was packed to a height of ten inches for the start of each run. Flow direction for the secondary effluent was downflow while regeneration was always upflow. After regeneration the bed was washed downflow with a hot (ab. 80° C.) salt solution until a pH below 9 was achieved in the effluent. All zeolites were treated with essentially the same synthetic secondary effluent which had the following composition:

| Synthetic Secondary Effluent | |
|---|---|
| $NH_4^+$ as N | 15 mg/l |
| $Na^+$ | 51 mg/l |
| $K^+$ | 11 mg/l |
| $Ca^{++}$ | 56 mg/l |
| $Mg^{++}$ | 28 mg/l |

Each tank of freshly prepared secondary effluent was analyzed for the exact $NH_4^+$ content, variations were extremely small between tanks.

A flow rate of 20 bed volumes (bv) per hour was employed for samples during loading (i.e. ammonia exchange); the regeneration flow rate was 10 bv/hr. All loadings and regenerations were performed at room temperature, the only exception being washing of the beds after regeneration with the solution at about 80° C.

The effluent was sampled during the $NH_4^+$ removal cycle at intervals of every hour and analyzed for $NH_4^+$ content; during regeneration, samples were taken at half hour intervals. To analyze for $NH_4^+$ content in the effluent samples, a boric acid modified Kjeldahl method was used.

Cyclic evaluation of all samples is based on 10% $NH_4^+$ breakthrough of the bed, i.e. the $NH_4^+$ content of the effluent is 10% of the $NH_4^+$ influent concentration. The 10% $NH_4^+$ breakthrough is equal to 1.5 mg/l; this is the maximum $NH_4^+$ content allowed by most states which presently have laws pertaining to $NH_4^+$ content of water.

(5) Accurately weigh out (to four places) 0.15 g. ignited weight of dried sample and determine its $NH_4^+$ content by Kjeldahl titration using 0.02525 N HCl.

(6) The $NH_4^+$ exchange levels are stated as milliequivalents of $NH_4^+$ per gram (1000° C. ignited wt.) of zeolite after $NH_4^+$ exchange: meq. $NH_4^+$/g. ign. wt. spl.

Maximum ammonium exchange capacities are also expressed on the basis of meq./gm. of the potassium form ("X" in table) by dividing "h" by (1−0.0471h). Since the maximum theoretical $NH_4^+$ capacity (Xmax) is easily calculated, the effective zeolite purity ("% 'Pure'") is 100 times the ratio X/Xmax.

The competitive cation $NH_4^+$ exchange capacities were measured as follows:

(1) Mix 5.0 g. (dry wt.) sample into 250 ml. of the following solution:

| Salt | Meq./l |
|---|---|
| $NH_4Cl$ | 70 |
| NaCl | 85 |
| KCl | 50 |
| $CaCl_2$ | 5 |

DYNAMIC MIXED CATION EXCHANGE

| Zeolite Form | Cycle | Capacity, in Bed Volumes | Bed Vol. Req. to Regenerate | Regeneration Sol. | Concentration of $NH_4^+$ in Regenerant vs. Sec. Effluent |
|---|---|---|---|---|---|
| Phillipsite (20 × 50) $K^+$ Exchanged | 1 | 220 | 20 | 1N KCl, pH-12 | 11 |
|  | 2 | 220 | 30 | 1N NaCl, pH-12 | 7.3 |
|  | 3 | 470 | 30 | " | 15.6 |
| Clinoptilolite (20 × 50)[(1)] | 1 | 190 | 20 | 1N NaCl, pH-12 | 9.5 |
|  | 2 | 210 | 20 | " | 10.5 |
| Clinoptilolite (20 × 50) $K^+$ Exchanged | 1 | 60 | 10 | 1N KCl, pH-12 | 6 |
|  | 2 | 60 |  | " |  |
| $K_2F$ (20 × 50)[(2)] | 1 | 540 | 45 | 1N NaCl, pH-12 | 12 |
|  | 2 | 350 |  |  |  |
| $K_2F$ (40 × 50) | 1 | 680 | 40 | 1N KCl, pH-12 | 17 |
|  | 2 | 380 | 35 | " | 10.8 |
|  | 3 | 410 | 30 | " | 13.6 |
|  | 4 | 430 | 30 | " | 14.3 |

[(1)]Baroid Div., Nat'l Lead, 75% min. zeolite content
[(2)]80% $K_2F$ cake, 20% Avery clay, 3% organic binder

EXAMPLE II

This Example demonstrates the determination of maximum and competitive ammonium ion exchange capacities of a series of zeolites, including phillipsite and zeolite W of the invention.

The maximum $NH_4^+$ exchange capacities ("h" in the following Table) were measured by the following procedure:

(1) Treat a 5 g. sample (as is wt.) with 3 batch exchanged (at room temperature) as follows:
  (a) Shake in 500 ml. of 4 N $NH_4Cl$ for ½ hour for the first and second exchanges, and 1 hour for the third exchange.
  (b) Centrifuge and decant between exchanges.

(2) After the third exchange, wash sample by shaking in 500 ml. distilled water for ½ hour, centrifuge, and decant.

(3) Dry sample at 100° C. until dry enough to handle easily.

(4) Determine the LOI (at 1000° C.) on 0.2-0.3 g. of dried sample by standard procedure.

(2) Shake on a wrist-action shaker.

(3) Take 10 ml. aliquot samples after ½ hr. and 2 hrs. shaking (each 10 ml. sample was centrifuged and any solid residue from the ½ hr. sample was quickly rinsed back into the exchange solution using a minimum amount of water).

(4) Determine the $NH_4^+$ content of the 10 ml. samples by Kjeldahl titration using 0.02525 N HCl.

(5) Calculate the $NH_4^+$ exchange level of the zeolite sample at ½ hr. ("$B_1$") and 2 hrs. ("$B_2$") by difference, i.e. by assuming that all of the $NH_4^+$ removed from the solution was exchanged on the zeolite.

(6) The $NH_4^+$ exchange levels are stated as milliequivalents of $NH_4^+$ per gram (dry wt.) of starting zeolite before $NH_4$ exchange: meq. $NH_4^+$/g. dry wt. spl.

The quantities $B_1/X$ and $B_2/X$ are then calculated, and represent a measure of the fraction of the ammoniumexchangeable sites occupied by ammonium ions under the defined mixed cation exchange conditions.

Lastly, the quantities $B_1$ Xmax/X and $B_2$ Xmax/X are calculated. These represent ammonium ion exchange capacity per unit weight of zeolite, and accordingly are independent of zeolite purity.

MIXED CATION EXCHANGE TESTS

| (a) | | (b) | (c) | (d) | (e) | (f) | (g) | (h) | (i) | (j) | (k) | (l) |
|---|---|---|---|---|---|---|---|---|---|---|---|---|
| | | | \multicolumn{2}{c}{Max. $NH_4^+$ Exch. Cap. (meq./gm)} | | | \multicolumn{4}{c}{Mixed Cation Exch. (meq./gm)} | | | |
| Test No. | Zeolite Type | Form | Per. gm. Ign. h | Per. gm. $K^+$ Form X | Max. Theor. $X_{max}$ | % "Pure" $100X/X_{max}$ | ½ hr. $B_1$ | 2 hrs. $B_2$ | $B_1/X$ | $B_2/X$ | $\dfrac{B_1 \cdot X_{max}}{X}$ | $\dfrac{B_2 \cdot X_{max}}{X}$ |
| 1 | Phillipsite | Powder | 2.17 | 1.97 | 5.1 | 39 | 0.62 | 0.76 | .315 | .386 | 1.61 | 1.97 |
| 2 | Phillipsite | Powder | 4.30 | 3.58 | 5.1? | 70 | 1.08 | 1.13 | .302 | .316 | 1.54 | 1.61 |
| 3 | $K_2W$ | Cake | 6.56 | 5.01 | 4.1–5.1 | 98+ | 1.37 | 1.40 | .273 | .279 | 1.12–1.39 | 1.14–1.42 |
| 4 | $K_2F$ | Cake | 7.04 | 5.29 | 6.3 | 84.0 | 1.85 | 1.90 | .350 | .359 | 2.21 | 2.26 |
| 5 | Clinoptilolite | mesh 20 × 50 | 2.41 | 2.16 | 3.2 | 67 | 0.98 | 0.72 | .454 | .333 | 1.45 | 1.07 |
| 6 | NaX | 8 × 12 | 4.50 | 3.70 | 5.8 | 63.8 | 0.57 | 0.80 | .154 | .216 | 0.89 | 1.25 |
| 7 | NaA | Cake | 7.21 | 5.38 | 6.3 | 85.5 | 1.48 | 1.07 | .275 | .199 | 1.73 | 1.25 |
| 8 | Erionite | Powder | 2.69 | 2.39 | 3.0 | 80 | 0.98 | 0.64 | .410 | .268 | 1.23 | 0.80 |
| 9 | Na Mordenite | Powder | 2.75 | 2.43 | 2.5 | 97 | 0.98 | 1.12 | .403 | .461 | 1.01 | 1.15 |

$X = h/(1 + 0.0471h)$

EXAMPLE III (a) A series of experiments were conducted to compare the zeolites heretofore preferred in prior proposed waste water treatment processes, namely clinoptilolite and zeolite F, with phillipsite-type zeolites of the present invention for their effectiveness in treating an aqueous ammonium ion-containing solution, which contains significant amounts of calcium cations, for ammonium ion removal.

The procedure followed in each case was to place a constant amount of the zeolite in a vertical tube, in the form of a packed bed of granular zeolite, approximately one inch diameter by 12 inches long; then to insure that the zeolite was in the sodium cation form by washing the zeolite bed with 16 gallons of 0.1 N sodium chloride solution; then to pass a simulated waste water feed solution, of constant composition, through the bed, analyzing the effluent and monitoring it to determine a "breakthrough" condition corresponding to the appearance of ammonium ion in the bed effluent at a concentration of 10% of the ammonium ion in the feed stream; then to regenerate the bed with a solution of 1.0 N sodium chloride, adjusted to pH of 12.0 (with sodium hydroxide), until the effluent $NH_4^+$-N concentration was <1.5 ppm; then to rinse with deionized water until the effluent pH was <9.5; then to resume feed solution flow;

In the experiments described herein, five zeolites were selected for testing, and one other, namely the clinoptilolite of the prior art, the zeolite F of the prior art Breck patent, two different samples of zeolite W within the scope of the invention, and the zeolite phillipsite, also within the scope of the invention;

The feed stream utilized in each case was a synthetic secondary effluent having the composition described in Table I below:

FEED SOLUTION (SYNTHETIC SECONDARY EFFLUENT)

| Cation | Conc., mg/L |
|---|---|
| $NH_4^+$ (as N) | 15 |
| $Na^+$ | 51 |
| $K^+$ | 11 |
| $Ca^{++}$ | 56 |
| $Mg^{++}$ | 2.8 |

The results obtained over four cycles of operation are shown graphically in FIG. 1.

As the curves shown in FIG. 1 demonstrate, by far and away the best zeolite, initially, for treatment of streams containing ammonia is the zeolite F of the prior art; in the first cycle, the zeolite bed was capable of treating 910 volumes of feed per volume of zeolite, until 10% of the initial ammonium ion concentration appeared in the effluent ("breakthrough"); As the data also demonstrate, the prior art zeolite clinoptilolite was, initially, less than half as effective as the prior art zeolite F; And as the data also show, the zeolites of the present invention, namely zeolite W and natural phillipsite, are likewise only about half as effective, initially, as is the prior art zeolite F, and only slightly more effective than the prior art clinoptilolite;

However, after the second, then the third, and then the fourth cycles, the data reveals what occurs when a feed stream containing polyvalent cations such as calcium and magnesium is employed, namely that the originally excellent zeolite F loses approximately half its capacity after the first cycle; the mediocre prior art clinoptilolite likewise loses approximately half its capacity after the first cycle; but the zeolites of the present invention actually appear to increase their capacities upon successive cycles of use and regeneration, and after several cycles are superior to the prior art zeolites.

(b) Since the different capacity of a given zeolite can, and usually does, change as its original cations are replaced by different cation species as a result of contact with the feed solution and subsequent regeneration, the volume of feed solution treated before $NH_4^+$ breakthrough which constitutes an early cycle is not necessarily the same for later cycles. Comparing the performance of a given zeolite against the cumulative volume of feed solution passed through the bed reveals that the selectivity of the phillipsite type zeolites of the present invention for $NH_4^+$ in the presence of calcium cations soon surpasses that of zeolite F and remains greater than that of clinoptilolite regardless of the number of cycles involved. This data is shown by the curves of FIG. 2. Moreover, a comparison of the the curves of FIG. 1 and FIG. 2 is strong evidence that the zeolites tend to reach a steady state with respect to $NH_4^+$ selectivity which is in large part the result of prolonged exposure to calcium cations rather than cycle periods which is significant.

EXAMPLE IV (a) Samples of sodium zeolite B powder and potassium zeolite W powder were contacted at room temperature with an aqueous solution having a pH of 8.0 containing the following cations and in the concentrations appearing below:

| cation | meq./liter |
|--------|------------|
| $NH_4^+$ | 63 |
| $Na^+$ | 115 |
| $K^+$ | 17 |
| $Ca^{++}$ | 132 |
| $Mg^{++}$ | 36.3 |

This solution is representative of a typical secondary waste water treatment effluent. It was found that the $NH_4^+$ capacity of the zeolite B in this test was about 1.4 meq./gm. and that the $NH_4^+$ capacity for zeolite W was about 2.2 meq./gm. It is therefore possible to calculate the steady state capacity of the zeolite B using the data from Example III, above. Thus, for a bonded mesh zeolite B comparable with the bonded zeolite W shown in Example III, the cyclic steady state $NH_4^+$ capacity is about 416 bed volumes of feed to 10% $NH_4^+$ breakthrough. This value is shown in FIG. 2.

(b) Harmotome, being topologically similar to phillipsite which in turn has been shown to provide similar $NH_4^+$ exchange performance to zeolite W and differing primarily in the cation population and the $SiO_2/Al_2O_3$ molar ratio, the total $NH_4^+$ ion exchange capacity for harmotome is readily calculated from the data for zeolite W. Thus the total ion exchange capacity for the 100% sodium cation form of harmotome is 3.81 meq./gm. compared with 5.26 meq./gm. for NaW. The further calculation of the type used in part (a) of this Example results in the finding that the cyclic steady state $NH_4^+$ capacity for Na-Harmotome is about 470 bed volumes of feed to 10% $NH_4^+$ breakthrough using the feedstock of Example III as the test solution. This value is shown in FIG. 2.

What is claimed is:

1. In the process for removing ammonium ions from an aqueous medium containing calcium ions which includes the steps of:
    (a) contacting said aqueous solution with the sodium cation form of a crystalline zeolite whereby ammonium cations and calcium cations are exchanged with sodium cations of the crystalline zeolite, and isolating at least a portion of the ammonium and calcium cation depleted aqueous medium;
    (b) regenerating the crystalline zeolite containing the ammonium and calcium cations resulting from step (a) by contacting same with an aqueous solution of sodium cation whereby at least a portion of the zeolitic ammonium and calcium cations are replaced by sodium cations;
    (c) repeating the cycle which comprises step (a) followed by step (b) for at least three times so that the crystalline zeolite has undergone a total of at least four cycles;
the improvement which comprises employing as the crystalline zeolite, zeolite W or phillipsite.

2. Process according to claim 1 wherein the zeolite is zeolite W.

* * * * *